US012638997B2

(12) United States Patent
Zhang et al.

(10) Patent No.: US 12,638,997 B2
(45) Date of Patent: May 26, 2026

(54) METHOD, DEVICE, AND COMPUTER PROGRAM PRODUCT FOR DATA MIGRATION

(71) Applicant: Dell Products L.P., Round Rock, TX (US)

(72) Inventors: Shuning Zhang, Beijing (CN); Lei Gao, Beijing (CN); Weibing Zhang, Beijing (CN); Lisen Guo, Kangze Jiayu (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/209,089

(22) Filed: Jun. 13, 2023

(65) Prior Publication Data

US 2024/0184471 A1      Jun. 6, 2024

(30) Foreign Application Priority Data

Dec. 2, 2022      (CN) .......................... 202211542071.5

(51) Int. Cl.
G06F 3/06          (2006.01)
(52) U.S. Cl.
CPC .......... G06F 3/0647 (2013.01); G06F 3/0604 (2013.01); G06F 3/064 (2013.01); G06F 3/0644 (2013.01); G06F 3/067 (2013.01); G06F 3/0673 (2013.01)
(58) Field of Classification Search
None
See application file for complete search history.

(56) References Cited

U.S. PATENT DOCUMENTS

| | | | |
|---|---|---|---|
| 7,562,101 B1 * | 7/2009 | Jernigan, IV | ....... G06F 11/2221 |
| | | | 707/999.2 |
| 9,355,112 B1 * | 5/2016 | Armangau | .......... G06F 16/1744 |
| 10,534,566 B1 * | 1/2020 | Bk | ........................ G06F 3/0649 |
| 11,099,986 B2 | 8/2021 | Mao et al. | |
| 11,275,509 B1 | 3/2022 | Colgrove et al. | |

(Continued)

FOREIGN PATENT DOCUMENTS

| | | | | |
|---|---|---|---|---|
| CN | 115022342 A | * | 9/2022 | |
| WO | WO-2016014035 A1 | * | 1/2016 | ............. G06F 17/30 |

OTHER PUBLICATIONS

IEEE. IEEE 100: The Authoritative Dictionary of IEEE Standards Terms. 2000. IEEE. 7th ed. p. 104.*

(Continued)

*Primary Examiner* — Nathan Sadler
(74) *Attorney, Agent, or Firm* — BainwoodHuang

(57)          ABSTRACT

Techniques for data migration involve obtaining, at an edge device, a bitmap in a local memory, the bitmap including a plurality of parameter values. The techniques further involve updating, in response to a data block being written or read, a data heat value of the data block based on the bitmap. The techniques further involve migrating the data block between the edge device and a cloud device based on the updated data heat value. Accordingly, there is a solution for migrating data blocks between an edge device and a cloud device, such that data with a high data heat value is stored at the edge device and data with a low data heat value is stored at the cloud device, thereby improving the performance of a storage system.

20 Claims, 9 Drawing Sheets

(56)                    References Cited

U.S. PATENT DOCUMENTS

| | | | |
|---|---|---|---|
| 11,573,864 B1 | 2/2023 | Hassan et al. | |
| 2006/0242378 A1* | 10/2006 | Kano | G06F 3/0647 |
| | | | 711/170 |
| 2009/0204611 A1* | 8/2009 | Kamada | G06F 16/3334 |
| | | | 707/999.005 |
| 2010/0332401 A1* | 12/2010 | Prahlad | G06F 3/0605 |
| | | | 711/E12.001 |
| 2018/0157655 A1* | 6/2018 | Dain | G06F 16/119 |
| 2019/0073155 A1* | 3/2019 | Craig | G06F 3/0604 |
| 2021/0173588 A1 | 6/2021 | Kannan et al. | |
| 2021/0303164 A1 | 9/2021 | Grunwald et al. | |
| 2021/0318803 A1* | 10/2021 | Zhu | H04L 67/1097 |
| 2022/0334725 A1 | 10/2022 | Mertes et al. | |

OTHER PUBLICATIONS

Translation of CN-115022342-A. 2024.*

Dominic Giampaolo. Practical File System Design. 1999. Morgan Kaufmann. pp. 12-16.*

Somasundaram et al. Information Storage and Management. 2009. Wiley. pp. 79-81.*

* cited by examiner

200

202

Obtain, at an edge device, a bitmap in a local memory, the bitmap including a plurality of parameter values

204

Update, in response to a data block being written or read, a data heat value of the data block based on the bitmap

206

Migrate the data block between the edge device and a cloud device based on the updated data heat value

400

401 Start writing

402 Is a heat value less than a threshold? — No

Yes

403 Write data to a cloud device

404 Write the data to an edge device

405 Update a cumulative access count

406 Is it necessary to update the heat value? — No

Yes

407 Trigger a back-end service

408 End

800

801 Start reading

802 Is a location identifier equal to 1 ?

No

Yes

805 Is the identifier equal to 2 and are an offset and a length matched?

Yes

No

806 Read the data from a cloud device

803 Read data from an edge device

No

807 Is the location identifier equal to 0?

Yes

804 Update a cumulative access count

808 End

METHOD, DEVICE, AND COMPUTER PROGRAM PRODUCT FOR DATA MIGRATION

CROSS-REFERENCE TO RELATED APPLICATION

This application claims priority to Chinese Patent Application No. CN202211542071.5, on file at the China National Intellectual Property Administration (CNIPA), having a filing date of Dec. 2, 2022, and having "METHOD, DEVICE AND COMPUTER PROGRAM PRODUCT FOR DATA MIGRATION" as a title, the contents and teachings of which are herein incorporated by reference in their entirety.

TECHNICAL FIELD

Embodiments of the present disclosure generally relate to the technical field of computers, and more specifically to a method, a device, and a computer program product for data migration.

BACKGROUND

Edge storage and cloud storage are a set of relative concepts. Under a traditional cloud computing architecture, storage clusters are deployed in central computer rooms of cloud service manufacturers. For example, central storage, i.e., a traditional cloud storage service, is: installing storage clusters in these data centers and providing storage services outside over a network. Deploying storage clusters outside central computer rooms and also providing storage services over the network may be referred to as edge storage.

Compared with cloud storage, edge storage has low latency and high performance, but the corresponding storage cost is higher. Therefore, cloud storage and edge storage are usually used in combination in practice. In general, hot data with a high access frequency is stored in edge storage, and cold data with a low access frequency is stored in cloud storage, so that the advantages of different storage modes can be exploited while saving costs.

SUMMARY OF THE INVENTION

Embodiments of the present disclosure provide a method, a device, and a computer program product for data migration.

In one aspect of the present disclosure, a method for data migration is provided. The method includes: obtaining, at an edge device, a bitmap in a local memory, the bitmap including a plurality of parameter values; updating, in response to a data block being written or read, a data heat value of the data block based on the bitmap; and migrating the data block between the edge device and a cloud device based on the updated data heat value.

In another aspect of the present disclosure, an electronic device is provided. The device includes a processing unit and a memory, where the memory is coupled to the processing unit and stores instructions. The instructions, when executed by the processing unit, perform the following actions: obtaining, at an edge device, a bitmap in a local memory, the bitmap including a plurality of parameter values; updating, in response to a data block being written or read, a data heat value of the data block based on the bitmap; and migrating the data block between the edge device and a cloud device based on the updated data heat value.

In still another aspect of the present disclosure, a computer program product is provided. The computer program product is tangibly stored in a non-transitory computer-readable medium and contains computer-executable instructions. The computer-executable instructions, when executed, cause a computer to perform a method or process according to the embodiments of the present disclosure.

The Summary of the Invention part is provided to introduce the selection of concepts in a simplified form, which will be further described in the Detailed Description below. The Summary of the Invention part is neither intended to identify key features or essential features of the present disclosure, nor intended to limit the scope of the embodiments of the present disclosure.

DETAILED DESCRIPTION

Figure 1:
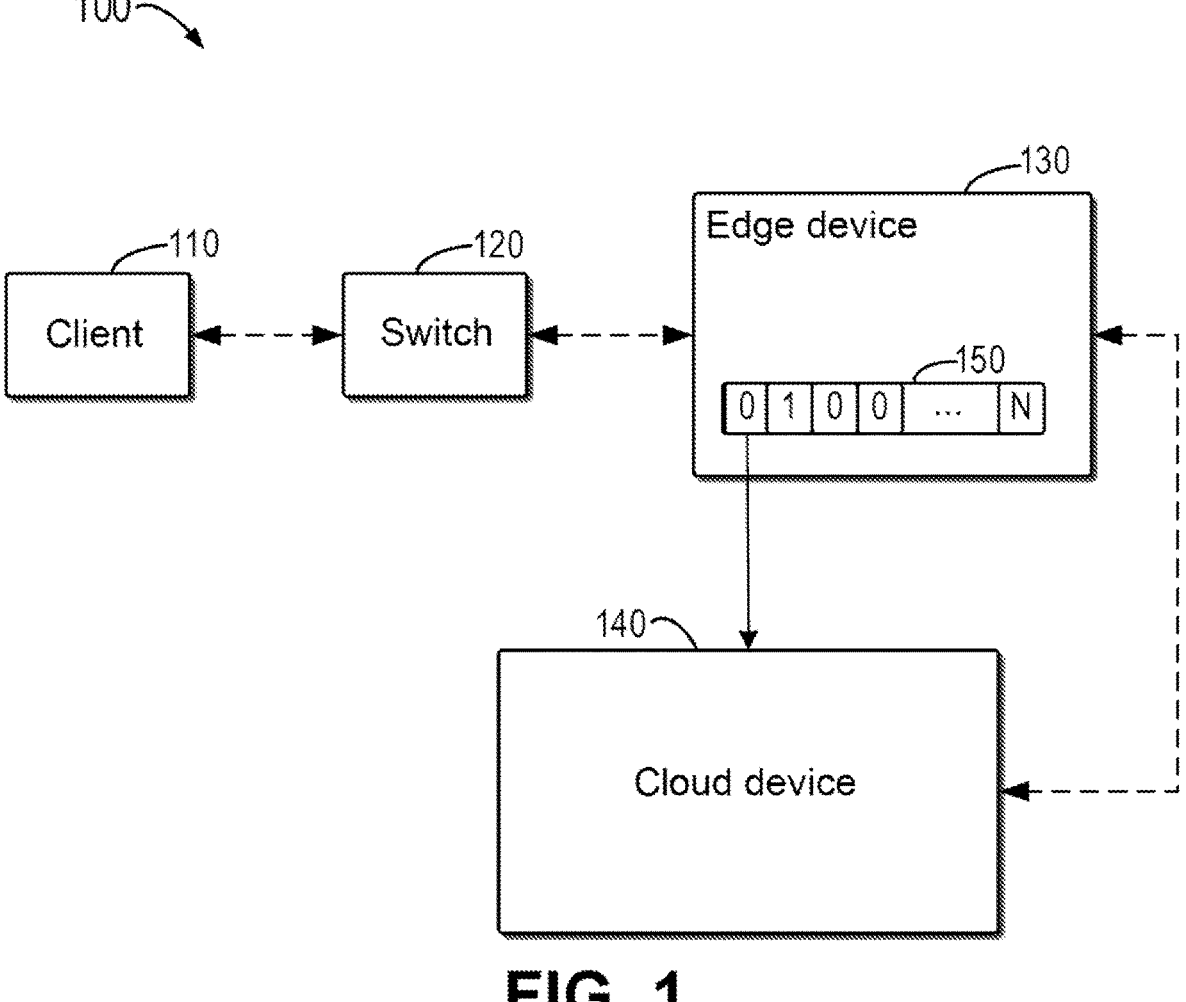
FIG. 1 illustrates a schematic diagram of an architecture of a portion of an example storage system according to the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. While some specific embodiments of the present disclosure are shown in the accompanying drawings, it should be understood that the present disclosure may be implemented in various forms, and should not be limited to the embodiments set forth herein. Rather, these embodiments are provided to make the present disclosure more thorough and complete and to fully convey the scope of the present disclosure to those skilled in the art.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects, unless otherwise specifically indicated.

Traditional data migration between an edge device and a cloud often requires additional hardware devices (e.g., cloud classification devices). However, in the process of data migration, the deployment of hardware devices results in technical complexity, which is not conducive to data migration. Furthermore, only snapshots of overall data of a logical unit number (LUN), instead of original data of an original LUN, can be migrated. That is, such hardware devices can only migrate one or more snapshots in the edge device, and cannot migrate the original LUN or a portion of the data in the LUN.

In this regard, embodiments of the present disclosure propose a new solution for data migration between an edge device and a cloud device. Embodiments of the present disclosure enable migration of data between an edge memory and a cloud memory automatically according to policies by using a smart LUN in the edge device, while not requiring additional hardware devices. In this way, the deployment complexity can be reduced.

According to some embodiments of the present disclosure, data in an LUN, rather than a snapshot of data, is migrated, thereby reducing the storage cost. Furthermore, according to some embodiments of the present disclosure, a portion of data can be migrated. For data in a smart LUN, data to be migrated is determined based on a comparison between a data heat value and a predefined threshold, thus facilitating increase of the storage flexibility.

The basic principles and some example implementations of the present disclosure will be illustrated below with reference to FIG. 1 to FIG. 9. It should be understood that these example embodiments are given only to enable those skilled in the art to better understand and thus implement the embodiments of the present disclosure, and are not intended to limit the scope of the present disclosure in any way.

FIG. 1 illustrates a schematic diagram of an architecture of a portion of an example storage system according to the present disclosure. Referring to FIG. 1, storage system 100 includes client 110, switch 120, edge device 130, and cloud device 140. It should be understood that storage system 100 may also include one or more other components not shown.

Client device 110 may be a user device. A user stores data in edge memory 130 using the client device. In some embodiments, data to be stored may be video monitoring data. Video monitoring is widely used, including commercial monitoring facilities for shops, banks, etc., public monitoring facilities for violation monitoring, electronic parking, etc., and personal monitoring facilities such as driving recorders, home cameras, etc. A user may choose to store the data at the edge device. A large amount of video monitoring data may be generated at any moment, and a storage system is required to store the video monitoring data. It should be understood that storage system 100 may also store other types of data for other types of services.

In some embodiments, switch 120 may be configured to connect client 110 with edge device 130, and data is uploaded to the edge device by switch 120. Although client 110 and edge device 130 are connected through a network, for the user, edge memory 130 is presented as disks on client 110 and these disks can be directly accessed. Therefore, it is very convenient for the user.

In some embodiments, edge device 130 includes smart LUN 150. The smart LUN 150 is used for storing data in the edge device, and when smart LUN 150 is created, a corresponding bitmap will also be created. In smart LUN 150, the storage space is divided into a plurality of data blocks. "0" and "1" shown in smart LUN 150 may indicate the magnitude of a heat value of a data block. For example, "0" may indicate that the heat value of the data block is low, and "1" may indicate that the heat value of the data block is low. Data in a data block with a low heat value may be migrated to cloud memory 140, so as to save the storage space of the edge device.

Cloud device 140 and edge device 130 may be linked through an HTTP service, so as to ensure that data may be migrated to each other. In some embodiments, cloud storage may be, for example, Amazon S3, Google Cloud, Alibaba Cloud, etc. Cloud storage is low in cost. That is, data with low access heat is stored in a cloud memory, thus saving the costs of storage services.

Figure 2:
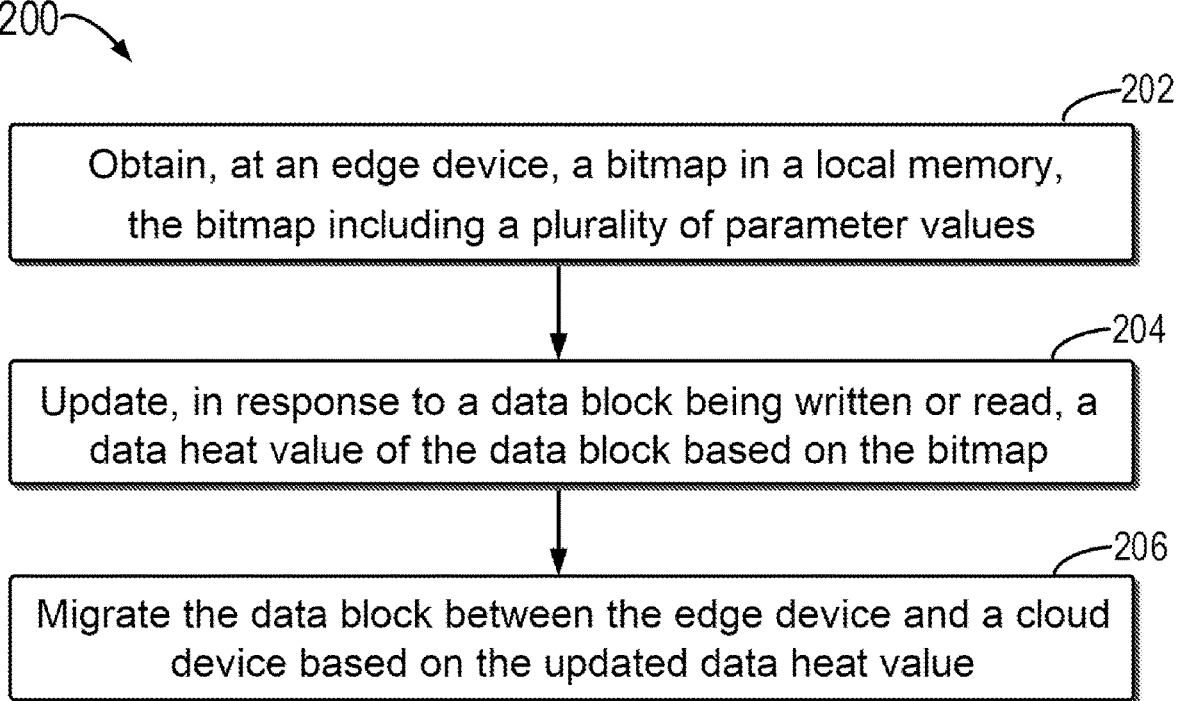
FIG. 2 shows a flowchart of a method for data migration according to an embodiment of the present disclosure.

FIG. 2 shows flowchart 200 of a method for fault detection according to an embodiment of the present disclosure. At 202, a bitmap in a local memory is obtained at an edge device, the bitmap including a plurality of parameter values. For example, for a bitmap in an edge device, a plurality of parameter values in the bitmap may be obtained, and an edge memory and a remote memory are operated according to these parameter values. Any known or future developed method may be used in conjunction with embodiments of the present disclosure to obtain the plurality of parameter values in the bitmap.

At 204, in response to a data block being written or read, a data heat value of the data block is updated based on the bitmap. For example, when a data block is written or read, a data heat value of the data block may be increased, while the data heat value of the data block may be reduced when the data block is not written or read for a long time. In some embodiments, the heat value may be updated by some predefined calculation methods, and the data heat value of the data block is updated in conjunction with the previous data heat value of the data block and the number of writes or reads of the data block at the current stage. Furthermore, both a weight of the previous data heat value of the data block and the weight of the number of writes or reads of the data block at the current stage may be adjusted, and different weights are associated with actual services of users when updating the data heat value of the data block.

At 206, the data block is migrated between the edge device and a cloud device based on the updated data heat value. For example, a data block with a low data heat value may be migrated from the edge memory of the edge device to the cloud memory of the cloud device. Since the low heat value of the data block indicates that data is rarely written or read, the data block may be migrated to the cloud memory to reduce the storage cost and improve the storage performance. In some embodiments, the magnitude of the data heat value may be determined by comparing the data heat value with a predefined threshold, depending on the actual services and the storage cost.

Therefore, with the method for data migration according to embodiments of the present disclosure, a data block can be migrated based on a data heat value in a bitmap without additional hardware devices, while performing migration at the granularity of data block without migrating a snapshot of overall data, thereby achieving more efficient data migration.

Figure 3:
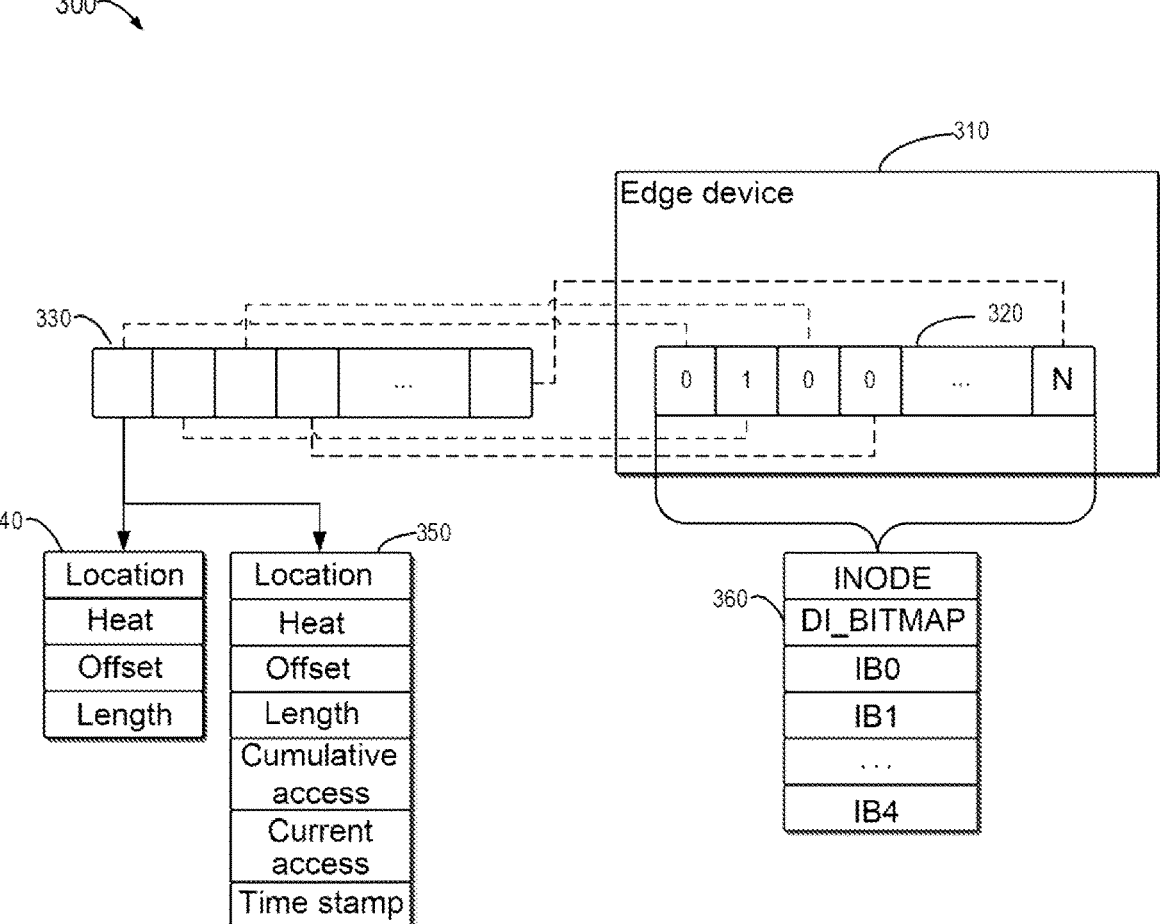
FIG. 3 illustrates a schematic diagram of an example framework of an edge device system according to an embodiment of the present disclosure.

FIG. 3 illustrates schematic diagram 300 of an example framework of edge device system 300 according to an embodiment of the present disclosure. As shown in FIG. 3, edge device system 300 may include edge device 310, smart LUN 320, bitmap 330, and INODE 360. Example implementations of all the modules are described separately below. It should be understood that edge device system 300 depicted in FIG. 3 is only one example implementation of an embodiment of the present disclosure and that edge device system 300 may include more or fewer modules.

As shown in FIG. 3, edge device 310 may include smart LUN 320. In some embodiments, edge device 310 may be configured to store user data. Data to be stored may be video monitoring data. Video monitoring is widely used, including commercial monitoring facilities for shops, banks, etc., public monitoring facilities for violation monitoring, electronic parking, etc., and personal monitoring facilities such as driving recorders, home cameras, etc. A large amount of video monitoring data may be generated at any moment, and a storage system is required to store the video monitoring data. The user may choose to store the data in edge device 310. It should be understood that edge device 310 may also store other types of data for other types of services. In some embodiments, the user data is stored in smart LUN 320. Smart LUN 320 is divided into a plurality of logical unit numbers, and the storage space is divided into a plurality of data blocks. "0" and "1" shown in smart LUN 320 may indicate the heat value of a data block. For example, "0" may indicate that the heat value of the data block is low, and "1" may indicate that the heat value of the data block is low. Data in a data block with a low heat value may be migrated to the cloud memory, so as to save the storage space of the edge device.

Bitmap 330 is also divided into a plurality of block spaces linearly, each block space corresponding to the data block in smart LUN 320. Bitmap 330 may be stored in a memory and may also be stored on a disk. The bitmap in the memory may have parameters 340. Parameters 340 include a location identifier, a data heat value, a data offset, and a data occupied length of the data block. In some embodiments, the location identifier of the data block indicates a data location, e.g., indicates that data is located at the edge device, at the cloud device, or at both the edge device and the cloud device. The data heat value is associated with an access count (e.g., write or read) of the data block and is updated after the access. The data offset indicates an offset at which data is written to the data block, and the data occupied length indicates an occupied length of data in the data block. Alternatively, bitmap 330 in the disk may have parameters 350. Parameters 350 include a location identifier, a data heat value, a data offset, a data occupied length, a cumulative access count, a previous access count, and a time stamp. For example, the cumulative access count records a cumulative access count of the data block, the previous access count records an access count of the data block in the previous time period, and the time stamp records a time stamp of the last time when the data heat value of the data block was updated. In some embodiments, the update of the data heat value may be updated based on the previous data heat value, the cumulative access count, the current access count, and the time stamp.

With continued reference to FIG. 3, INODE 360 includes DI_BITMAP and a plurality of IB trees. INODE 360 is configured to represent smart LUN 320. DI_BITMAP is a pointer indicating a bitmap storage location. The IB trees are configured to manage a plurality of data blocks in smart LUN 320.

Figure 4:
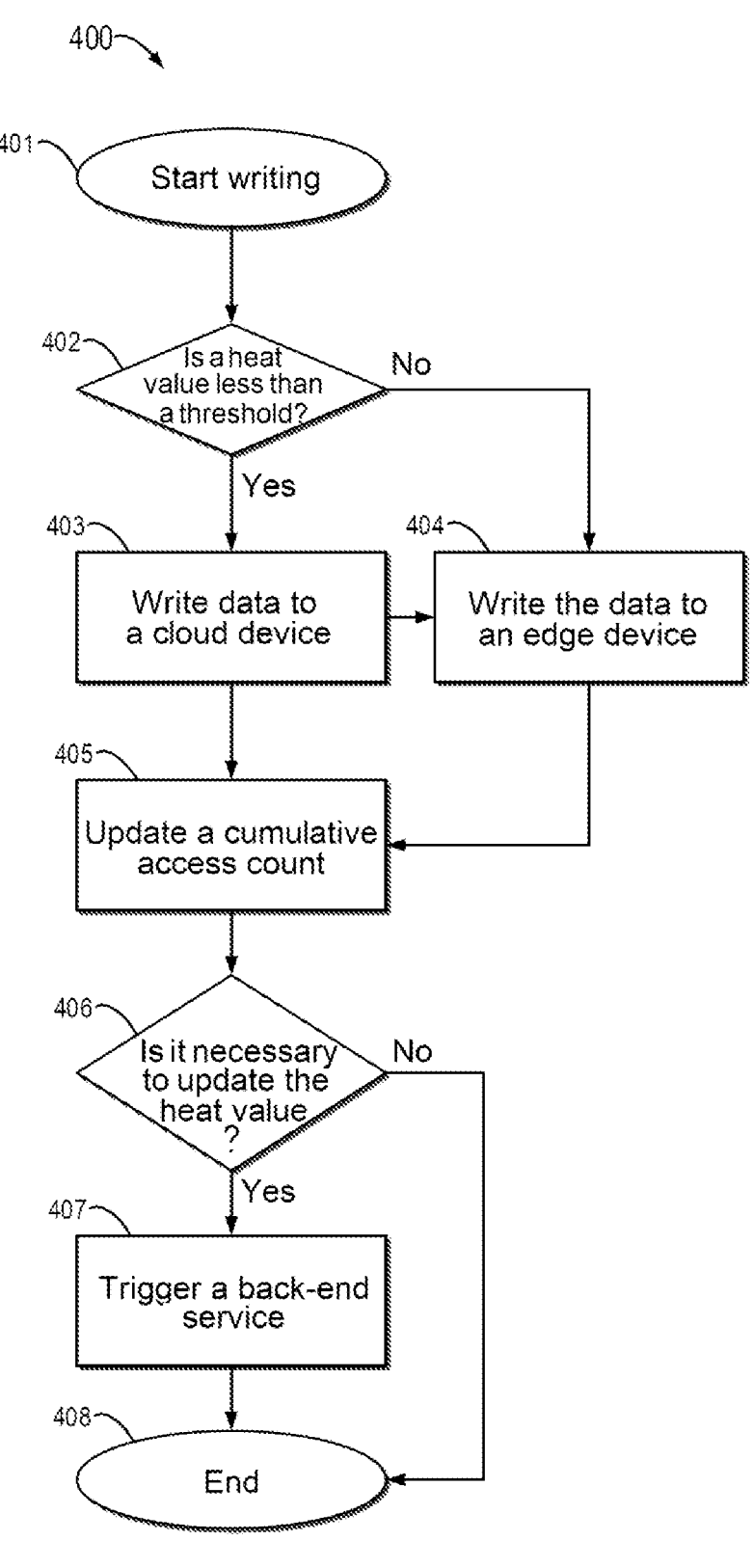
FIG. 4 illustrates an example flowchart of a write operation according to an embodiment of the present disclosure.

FIG. 4 illustrates example flowchart 400 of a write operation according to an embodiment of the present disclosure. At 401, a write operation is started. At 402, a data heat value is compared with a predefined threshold. For example, if the data heat value is less than the predefined threshold, it indicates that the data heat value is low, and if the data heat value is greater than the predefined threshold, it indicates that the data heat value is high. At 403, if the data heat value is less than the predefined threshold, data is written to a cloud device. In some embodiments, the predefined threshold may be defined by a customer, and adjusted according to service requirements. At 404, if the data heat value is greater than the predefined threshold, the data is written to an edge device. At 405, a cumulative access count is updated, the cumulative access count recording a count of accesses to a data block. At 406, it is determined whether to update the data heat value. If the data heat value needs to be updated, it proceeds to 407 to trigger a back-end service. The back-end service may migrate the data to the edge device if the updated data heat value is greater than the predefined threshold, otherwise the data is migrated to the cloud device. At 408, the write operation is ended.

Figure 5:
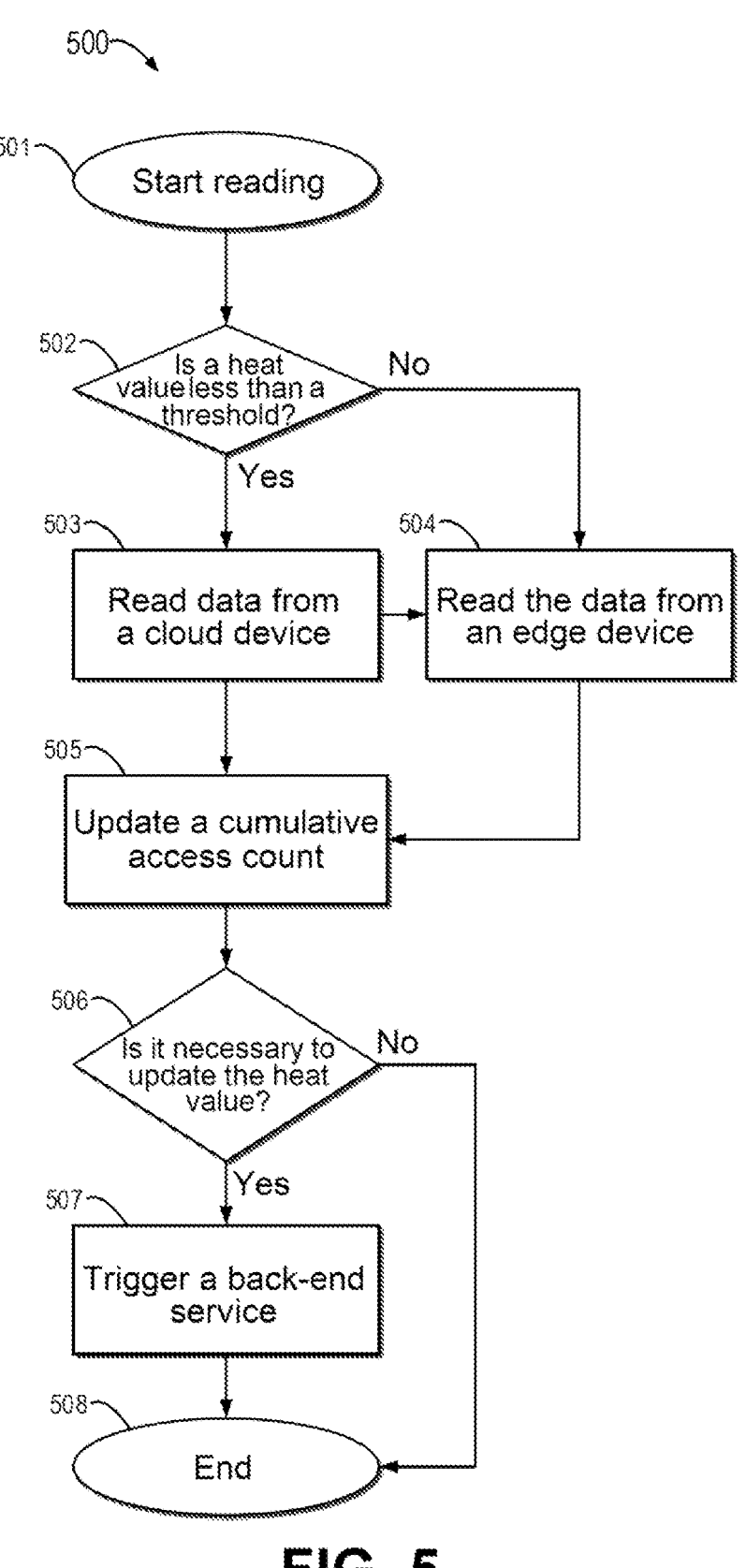
FIG. 5 illustrates an example flowchart of a read operation according to an embodiment of the present disclosure.

FIG. 5 illustrates example flowchart 500 of a read operation according to an embodiment of the present disclosure. At 501, a read operation is started. At 502, a data heat value is compared with a predefined threshold. For example, if the data heat value is less than the predefined threshold, it indicates that the data heat value is low, and if the data heat value is greater than the predefined threshold, it indicates that the data heat value is high. At 503, if the data heat value is less than the predefined threshold, data is read from a cloud device. In some embodiments, the predefined threshold may be defined by a customer, and adjusted according to service requirements. At 504, if the data heat value is greater than the predefined threshold, the data is read from an edge device. At 505, a cumulative access count is updated, the cumulative access count recording a count of accesses to a data block. At 506, it is determined whether to update the data heat value. If the data heat value needs to be updated, it proceeds to 507 to trigger a back-end service. The back-end service may migrate the data to the edge device if the updated data heat value is greater than the predefined threshold, otherwise the data is migrated to the cloud device. At 508, the read operation is ended.

Figure 6:
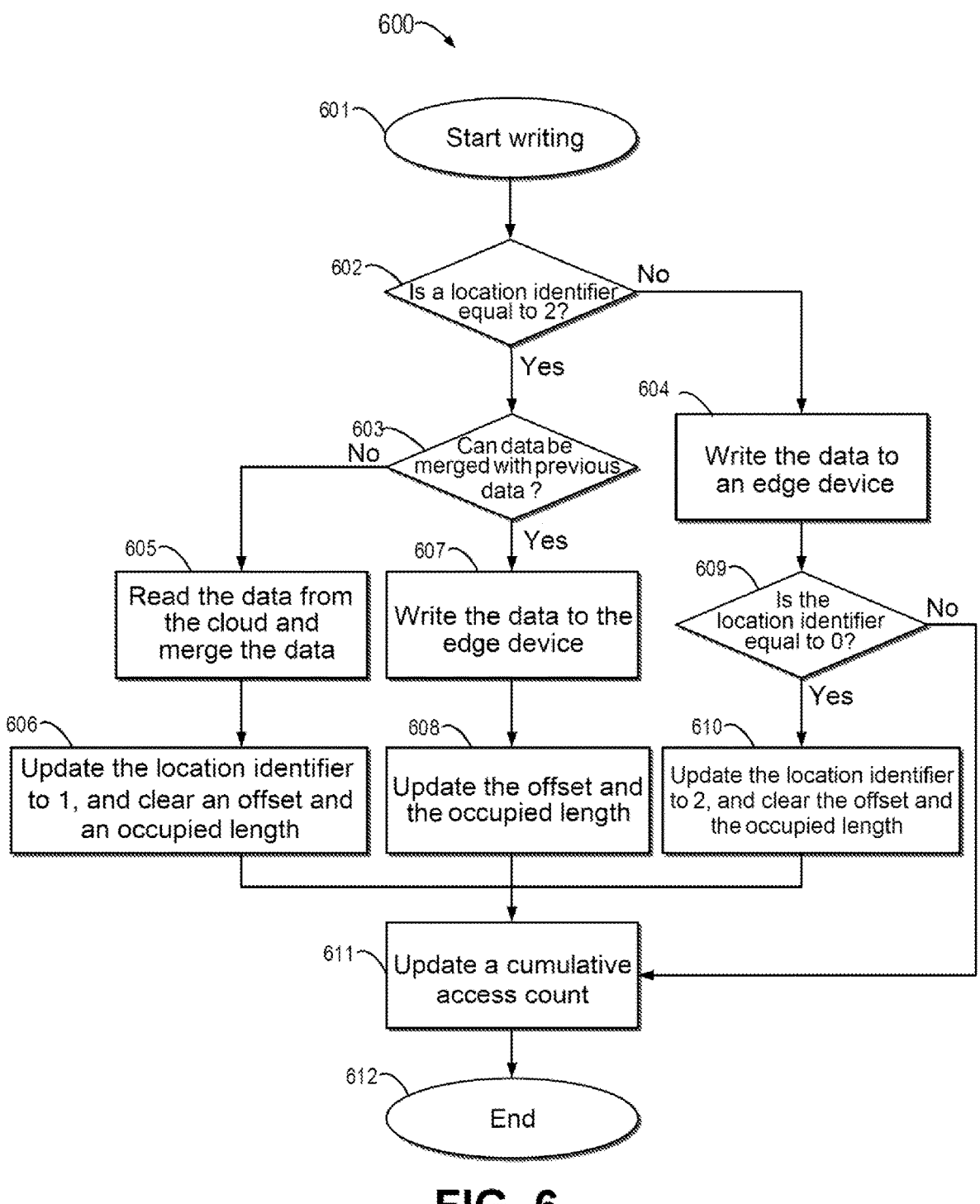
FIG. 6 illustrates another example flowchart of a write operation according to an embodiment of the present disclosure.

FIG. 6 illustrates another example flowchart 600 of a write operation according to an embodiment of the present disclosure. At 601, a write operation is started. At 602, it is determined whether a location identifier is 2, and if the location identifier is 2, it indicates that data is stored on both an edge device and a cloud device. If device data is stored on both the edge device and the cloud device, it proceeds to 603 to determine whether data being written may be merged with previous data, and if no, it proceeds to 605. At 605, data is read from the cloud, and the data being written is merged with the previous data. At 606, the location identifier is updated to 1, to indicate that the data is stored on the cloud device and at the same time, a data offset and a data occupied length are deleted. Then, it proceeds to 611 to update a cumulative access count and complete the write operation.

It returns to 603 to determine whether data being written may be merged with the previous data, and if yes, it proceeds to 607. At 607, the data is written to the edge device. At 608, the data offset and the data occupied length are updated. Then, it proceeds to 611 to update a cumulative access count and complete the write operation.

It returns to 602, and if the location identifier is not 2, it proceeds to 604. At 604, the data is written to the edge device. At 609, it is determined whether the location identifier is 0, if the location identifier is 0, it proceeds to 610 to update the location identifier to 2 and at the same time, update the data offset and the data occupied length, and then it proceeds to 611 to update the cumulative access count and complete the write operation. At 609, if the location identifier is not 0, it proceeds directly to 611 to update a cumulative access count and complete the write operation. While executing example flowchart 600, the back-end service may perform data migration based on a comparison between the data heat value and the predefined threshold, and update the location identifier at the same time. At 612, the write operation is ended.

Figure 7:
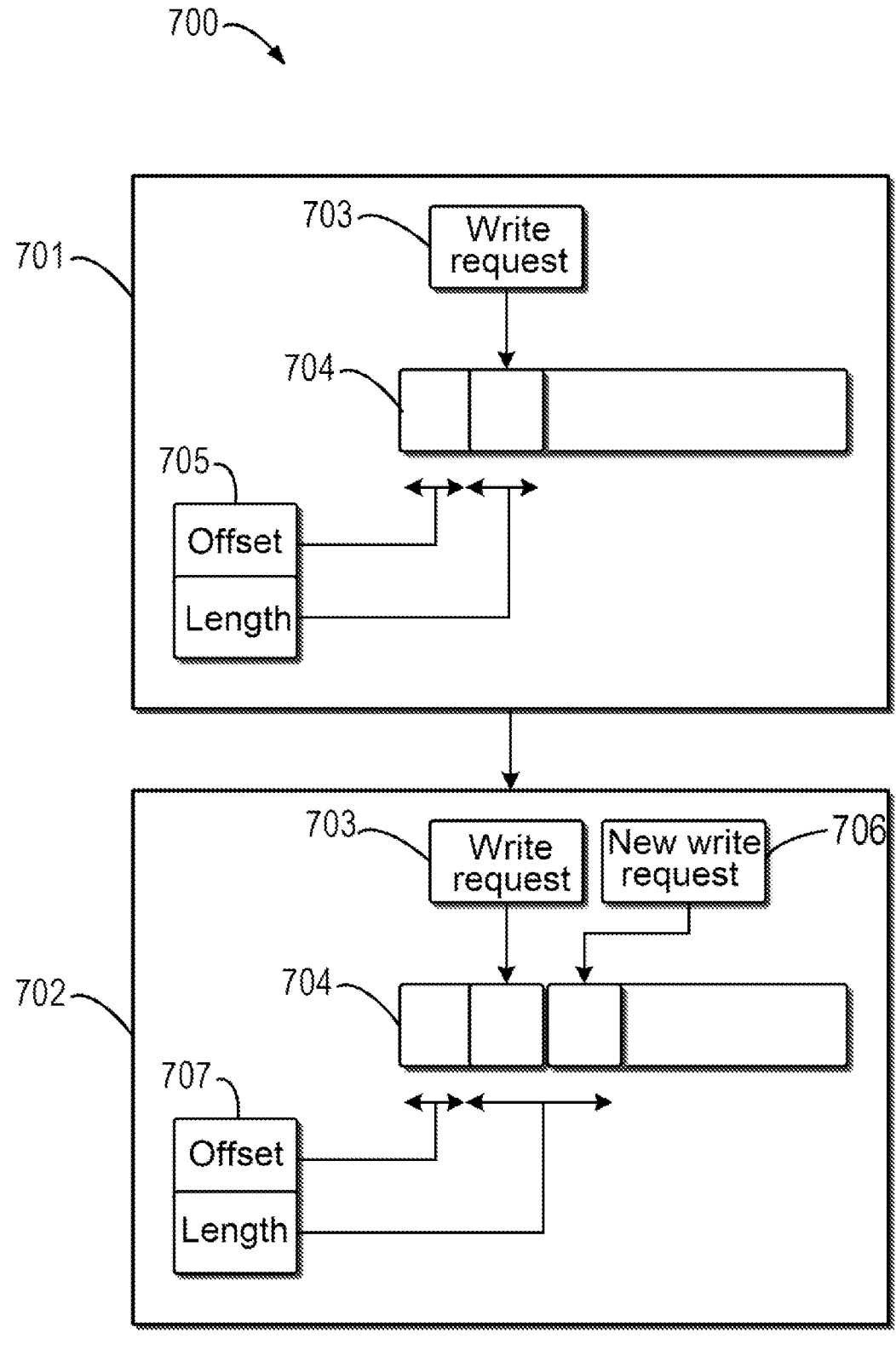
FIG. 7 illustrates an example flowchart for updating a data offset and a data occupied length according to an embodiment of the present disclosure.

FIG. 7 illustrates example flowchart 700 for updating a data offset and a data occupied length according to an embodiment of the present disclosure. At 701, write request 703 writes data into data block 704, a data offset and a data occupied length in data block 704 correspond to data offset and data occupied length 705, and it will be understood that data offset and data occupied length 705 may be different in different embodiments. At 702, in the case where write request 703 has been executed, new write request 706 is executed, and the data offset and the data occupied length in data block 704 correspond to data offset and data occupied length 707, where the data offset is unchanged, and the data occupied length is updated according to the length of the written data.

Figure 8:
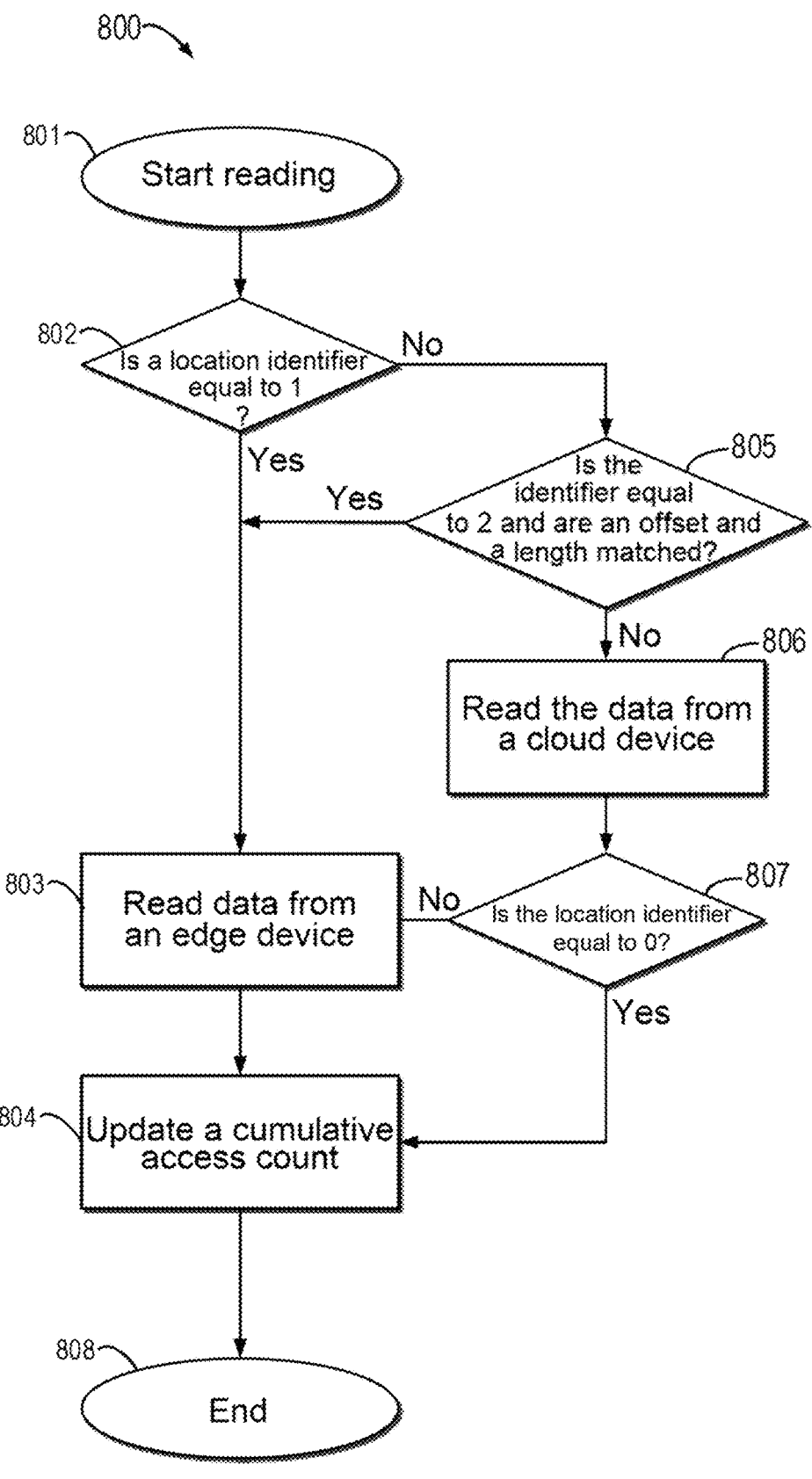
FIG. 8 illustrates another example flowchart of a read operation according to an embodiment of the present disclosure.

FIG. 8 illustrates another example flowchart 800 of a write operation according to an embodiment of the present disclosure. At 801, a write operation is started. At 802, it is determined whether a location identifier is 1, if the location identifier is 1, it indicates that data is stored in an edge device, and it proceeds to 803. At 803, data is read from the edge device, and after 803 is executed, at 804, a cumulative access count is updated, and a read operation is completed. Step 802 is executed again, if the location identifier is not 1, it proceeds to 805 to determine whether the location identifier is 2 and whether a data offset and a data occupied length are matched at 805, and if the condition is met, it proceeds to 803 to read the data from the edge device. Otherwise it proceeds to 806 to read data from a cloud device at 806. At 807, it is determined whether the location indicator is 0, and if the location indicator is 0, it proceeds to 804 to update the cumulative access count, otherwise it proceeds to 803 to read the data from the edge device. While executing example flowchart 800, the back-end service may perform data migration based on a comparison between the data heat value and the predefined threshold, while updating the location identifier. At 808, the write operation is ended.

Figure 9:
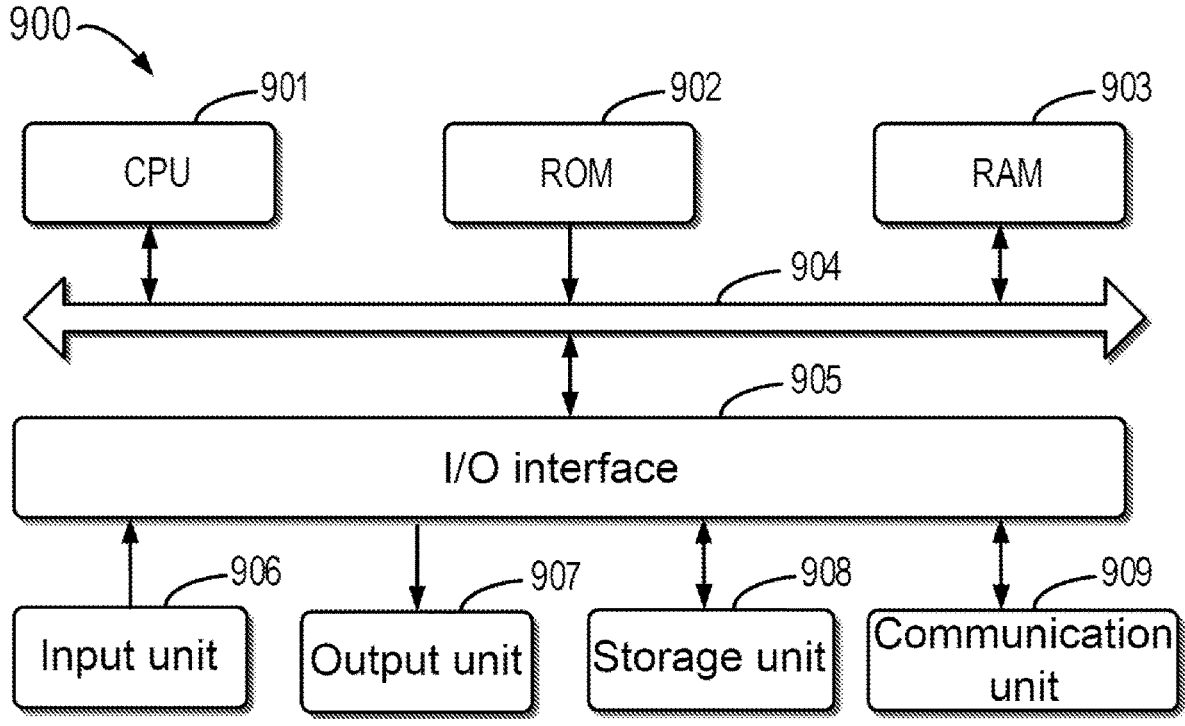
FIG. 9 shows a schematic block diagram of a device that may be configured to implement embodiments of the present disclosure.

FIG. 9 shows a schematic block diagram of device 900 that may be configured to implement an embodiment of the present disclosure. Device 900 may be a device or an apparatus as described in embodiments of the present disclosure. As shown in FIG. 9, device 900 includes central processing unit (CPU) 901 that may perform various appropriate actions and processing according to computer program instructions stored in read-only memory (ROM) 902 or computer program instructions loaded from storage unit 908 into random access memory (RAM) 903. Various programs and data required for the operation of device 900 may also be stored in RAM 903. CPU 901, ROM 902, and RAM 903 are connected to each other through bus 904. Input/output (I/O) interface 905 is also connected to bus 904. Although not shown in FIG. 9, device 900 may also include a co-processor.

A plurality of components in device 900 are connected to I/O interface 905, including: input unit 906, such as a keyboard and a mouse; output unit 907, such as various types of displays and speakers; storage unit 908, such as a disk and an optical disc; and communication unit 909, such as a network card, a modem, and a wireless communication transceiver. Communication unit 909 allows device 900 to exchange information/data with other devices via a computer network, such as the Internet, and/or various telecommunication networks.

The various methods or processes described above may be performed by processing unit 901. For example, in some embodiments, the method may be embodied as a computer software program that is tangibly included in a machine-readable medium, such as storage unit 908. In some embodiments, part or all of the computer program may be loaded and/or installed onto device 900 via ROM 902 and/or communication unit 909. When the computer program is loaded into RAM 903 and executed by CPU 901, one or more steps or actions of the methods or processes described above may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture which includes instructions for implementing various aspects of the functions/actions specified in one or more blocks in the flowcharts and/or block diagrams.

The computer-readable program instructions may also be loaded onto a computer, another programmable data processing apparatus, or another device, such that a series of operation steps are performed on the computer, another programmable data processing apparatus, or another device to produce a computer-implemented process. Thus, the instructions executed on the computer, another programmable data processing apparatus, or another device implement the functions/actions specified in one or more blocks in the flowcharts and/or block diagrams.

The flowcharts and block diagrams in the accompanying drawings show the architectures, functions, and operations of possible implementations of the device, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions denoted in the blocks may also occur in a sequence different from that shown in the figures. For example, two consecutive blocks may in fact be executed substantially concurrently, and sometimes they may also be executed in a reverse order, depending on the functions involved. It should be further noted that each block in the block diagrams and/or flowcharts as well as a combination of blocks in the block diagrams and/or flowcharts may be implemented by a dedicated hardware-based system executing specified functions or actions, or by a combination of dedicated hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the embodiments disclosed here.

The invention claimed is:

1. A method of data migration, comprising:
obtaining a bitmap in a local memory, the bitmap being divided into at least a first block space, the first block space corresponding to a first data block of a logical unit number (LUN), the first data block having a data heat value based on a cumulative access count for the first data block, the first block space including a plurality of parameter values for the first data block, the plurality of parameter values for the first data block including a location identifier for the first data block, and the cumulative access count for the first data block, an inode of the LUN including a pointer to the bitmap;
performing a first write operation for writing data to the first data block of the LUN, the performing of the first write operation comprising:
determining, from the location identifier for the first data block, that previous data of the first data block are stored on both the local memory and a cloud memory;
determining that the data to be written to the first data block cannot be merged with the previous data of the first data block stored on the local memory;
reading the previous data of the first data block stored on the cloud memory;
merging the data to be written to the first data block with the previous data of the first data block read from the cloud memory;
updating the location identifier for the first data block to indicate that the first data block is stored on the local memory; and
updating a cumulative access count for the first data block;
determining that the data heat value for the first data block is less than a predefined threshold; and
in response to determining that the data heat value for the first data block is less than the predefined threshold, migrating the first data block to the cloud memory.

2. The method according to claim 1, wherein the plurality of parameter values for the first data block of the LUN comprise:

a time stamp of a last time when the data heat value of the first data block of the LUN was updated;

a data offset of the first data block of the LUN;

a data occupied length of the first data block of the LUN; and a previous access count of the first data block of the LUN.

3. The method according to claim 2, further comprising: updating the data heat value of the first data block based on the cumulative access count of the first data block.

4. The method according to claim 3, wherein updating the location identifier of the first data block comprises:

determining the updated location identifier of the first data block based on the data offset of the first data block, the data occupied length of the first data block, and the location identifier of the first data block.

5. The method according to claim 3, further comprising: determining the updated data heat value of the first data block based on the cumulative access count of the first data block, the previous access count of the first data block, the time stamp of the last time when the data heat value of the first data block was updated, a current time stamp, and the data heat value of the first data block.

6. The method according to claim 3, further comprising: determining the updated cumulative access count of the first data block based on the cumulative access count of the first data block and the previous access count of the first data block.

7. The method according to claim 1, further comprising: representing the LUN by the inode, the inode including a plurality of indirect block (IB) trees, the plurality of IB trees managing the first data block of the LUN migrated to the cloud memory.

8. The method of claim 1 wherein the plurality of parameter values for the first data block include the location identifier for the first data block, the cumulative access count for the first data block, a data offset for the first data block, and a data occupied length for the first data block, and wherein the method comprises:

clearing the data offset and the data occupied length for the first data block.

9. The method of claim 1 wherein the bitmap is divided into at least the first block space, and a second block space, the second block space corresponding to a second data block of the LUN, the second data block having a data heat value based on a cumulative access count for the second data block, the second block space including a plurality of parameter values for the second data block, the plurality of parameter values for the second data block including a location identifier for the second data block, and the cumulative access count for the second data block, and wherein the method comprises:

performing a second write operation for writing data to the second data block of the LUN, the performing of the second write operation comprising:

determining, from the location identifier for the second data block, that previous data of the second data block are stored on both the local memory and the cloud memory;

determining that the data to be written to the second data block can be merged with the previous data of the second data block stored on the local memory;

writing the data to be written to the second data block to the local memory; and updating a cumulative access count for the second data block;

determining that the data heat value for the second data block is greater than the predefined threshold; and in response to determining that the data heat value for the second data block is greater than the predefined threshold, migrating the second data block to the local memory.

10. The method of claim 9 wherein the plurality of parameter values for the second data block include the location identifier for the second data block, the cumulative access count for the second data block, a data offset for the second data block, and a data occupied length for the second data block, and wherein the method comprises:

updating the data offset and the data occupied length for the second data block.

11. The method of claim 9 wherein the bitmap is divided into at least the first block space, the second block space, and a third block space, the third block space corresponding to a third data block of the LUN, the third data block having a data heat value based on a cumulative access count for the third data block, the third block space including a plurality of parameter values for the third data block, the plurality of parameter values for the third data block including a location identifier for the third data block, and the cumulative access count for the third data block, and wherein the method comprises:

performing a third write operation for writing data to the third data block of the LUN, the performing of the third write operation comprising:

determining, from the location identifier for the third data block, that previous data of the third data block are not stored on both the local memory and the cloud memory;

writing the data to be written to the third data block to the local memory;

determining, from the location identifier for the third data block, that the previous data of the third data block is stored on the cloud memory;

updating the location identifier for the third data block to indicate that data of the third data block are stored on both the local memory and the cloud memory; and updating the cumulative access count for the third data block;

determining that the data heat value for the third data block is greater than the predefined threshold; and in response to determining that the data heat value for the third data block is greater than the predefined threshold, migrating the third data block to the local memory.

12. The method of claim 11 wherein the plurality of parameter values for the third data block include the location identifier for the third data block, the cumulative access count for the third data block, a data offset for the third data block, and a data occupied length for the third data block, and wherein the method comprises:

clearing the data offset and the data occupied length for the third data block.

13. The method of claim 11 wherein the bitmap is divided into at least the first block space, the second block space, the third block space, and a fourth block space, the fourth block space corresponding to a fourth data block of the LUN, the fourth data block having a data heat value based on a cumulative access count for the fourth data block, the fourth block space including a plurality of parameter values for the fourth data block, the plurality of parameter values for the fourth data block including a location identifier for the fourth data block, and the cumulative access count for the fourth data block, and wherein the method comprises:

performing a fourth write operation for writing data to the fourth data block of the LUN, the performing of the fourth write operation comprising:

determining, from the location identifier for the fourth data block, that previous data of the fourth data block are not stored on both the local memory and the cloud memory;

writing the data to be written to the fourth data block to the local memory;

determining, from the location identifier for the fourth data block, that the previous data of the fourth data block is not stored on the cloud memory; and updating the cumulative access count for the fourth data block;

determining that the data heat value for the fourth data block is less than the predefined threshold; and in response to determining that the data heat value for the fourth data block is less than the predefined threshold, migrating the fourth data block to the cloud memory.

14. A computer program product having a non-transitory computer readable medium that stores a set of instructions to migrate data, the set of instructions, when carried out by processing circuitry, causing the processing circuitry to perform a method comprising:

obtaining a bitmap in a local memory, the bitmap being divided into at least a first block space, the first block space corresponding to a first data block of a logical unit number (LUN), the first data block having a data heat value based on a cumulative access count for the first data block, the first block space including a plurality of parameter values for the first data block, the plurality of parameter values for the first data block including a location identifier for the first data block, and the cumulative access count for the first data block, an inode of the LUN including a pointer to the bitmap;

performing a first write operation for writing data to the first data block of the LUN, the performing of the first write operation comprising:

determining, from the location identifier for the first data block, that previous data of the first data block are stored on both the local memory and a cloud memory;

determining that the data to be written to the first data block cannot be merged with the previous data of the first data block stored on the local memory;

reading the previous data of the first data block stored on the cloud memory;

merging the data to be written to the first data block with the previous data of the first data block read from the cloud memory;

updating the location identifier for the first data block to indicate that the first data block is stored on the local memory; and updating a cumulative access count for the first data block;

determining that the data heat value for the first data block is less than a predefined threshold; and in response to determining that the data heat value for the first data block is less than the predefined threshold, migrating the first data block to the cloud memory.

15. An electronic device, comprising:

processing circuitry; and a memory coupled to the processing circuitry and storing instructions, wherein the instructions, when executed by the processing circuitry, perform the following actions:

obtaining a bitmap in a local memory, the bitmap being divided into at least a first block space, the first block space corresponding to a first data block of a logical unit number (LUN), the first data block having a data heat value based on a cumulative access count for the first data block, the first block space including a plurality of parameter values for the first data block, the plurality of parameter values for the first data block including a location identifier for the first data block, and the cumulative access count for the first data block, an inode of the LUN including a pointer to the bitmap;

performing a first write operation for writing data to the first data block of the LUN, the performing of the first write operation comprising:

determining, from the location identifier for the first data block, that previous data of the first data block are stored on both the local memory and a cloud memory;

determining that the data to be written to the first data block cannot be merged with the previous data of the first data block stored on the local memory;

reading the previous data of the first data block stored on the cloud memory;

merging the data to be written to the first data block with the previous data of the first data block read from the cloud memory;

updating the location identifier for the first data block to indicate that the first data block is stored on the local memory; and updating a cumulative access count for the first data block;

determining that the data heat value for the first data block is less than a predefined threshold; and in response to determining that the data heat value for the first data block is less than the predefined threshold, migrating the first data block to the cloud memory.

16. The electronic device according to claim 15, wherein the plurality of parameter values for the first data block of the LUN comprise:

a time stamp of a last time when the data heat value of the first data block of the LUN was updated;

a data offset of the first data block of the LUN;

a data occupied length of the first data block of the LUN; and a previous access count of the first data block of the LUN.

17. The electronic device according to claim 16, wherein the actions further comprise:

updating the data heat value of the first data block based on the cumulative access count of the first data block.

18. The electronic device according to claim 17, wherein updating the location identifier of the first data block comprises:

determining the updated location identifier of the first data block based on the data offset of the first data block, the data occupied length of the first data block, and the location identifier of the first data block.

19. The electronic device according to claim 17, wherein the actions further comprise:

determining the updated data heat value of the first data block based on the cumulative access count of the first data block, the previous access count of the first data block, the time stamp of the last time when the data heat value of the first data block was updated, a current time stamp, and the data heat value of the first data block.

20. The electronic device according to claim 17, wherein the actions further comprise:

determining the updated cumulative access count of the first data block based on the cumulative access count of the first data block and the previous access count of the first data block.

\* \* \* \* \*

16